United States Patent [19]
Sakamoto

[11] Patent Number: 5,491,533
[45] Date of Patent: Feb. 13, 1996

[54] ELECTRONIC FLASH CONTROL SYSTEM AND METHOD FOR HIGH-SPEED FLASHING

[75] Inventor: Hiroshi Sakamoto, Kawasaki, Japan

[73] Assignee: Nikon Corporation, Tokyo, Japan

[21] Appl. No.: 267,400

[22] Filed: Jun. 29, 1994

[30] Foreign Application Priority Data

Jun. 29, 1993 [JP] Japan ..................... 5-158707

[51] Int. Cl.⁶ ..................... G03B 7/00
[52] U.S. Cl. .................. 354/416; 354/414; 354/415; 354/417
[58] Field of Search ..................... 354/414, 415, 354/416, 417

[56] References Cited

U.S. PATENT DOCUMENTS

| Re. 28,025 | 4/1968 | Murata et al. . |
| 4,049,996 | 9/1977 | Vital et al. . |
| 4,592,639 | 6/1986 | Nakamura ..................... 354/416 |
| 4,951,081 | 8/1990 | Hosomizu et al. ..................... 354/415 |
| 5,239,336 | 8/1993 | Matsui et al. ..................... 354/416 |

FOREIGN PATENT DOCUMENTS

| 60-225833 | 11/1985 | Japan . |
| 1-124838 | 5/1989 | Japan . |
| 3-144617 | 6/1991 | Japan . |

*Primary Examiner*—Michael L. Gellner
*Assistant Examiner*—Matthew Miller

[57] ABSTRACT

An electronic flash control system and method for a high-speed repeating flash having a main capacitor which stores energy for flashing, a discharge element, a switching apparatus, a control unit and a photometric unit. The switching apparatus causes the discharge element to flash multiple times during the exposure operation of the camera based on a signal from the control unit generated in accordance with the duty ratio. The duty ratio for each flash is determined by the control unit based on a signal from the photometric unit representative of the quantity of light from the previous flash of the discharge element. As the control system does not perform real-time control, delays of the control system do not adversely affect accuracy.

12 Claims, 4 Drawing Sheets

ELECTRONIC FLASH CONTROL SYSTEM AND METHOD FOR HIGH-SPEED FLASHING

BACKGROUND OF THE INVENTION

1. Field of the Invention

The present invention relates to an electronic flash control system and, more specifically, to a control system for high-speed repeated flashing, or so-called FP flashing, during the exposure operation.

2. Description of the Related Art

Photographic flash control systems have been developed which cause multiple high speed flashes to occur during a single exposure (hereafter referred to as "FP flashing"). These multiple flashes obtain a more uniform illumination of the scene than is possible with a single long term flash. Japanese Patent Publication Number SHO 60-225833 discloses an example of such a system, wherein FP flashing is used to achieve uniform illumination during the period when the shutter is open.

With normal single flash systems, it is preferable to control the amount of light reaching the scene. Conventionally, the flash operation is stopped when the quantity of light (integration value) reached a specified value during the flash operation. For example, Japanese Patent Publication Numbers HEI 1-124838 and HEI 3-144617, show a FP flashing system wherein the on/off duty ratio of the FP flashing is changed to control the quantity of light. These systems use relatively simple schemes which initially change the duty ratio and thereafter adjust the aperture and shutter to vary exposure.

However, in recent years, the focal plane shutters of cameras have become faster, with nominal shutter speeds of 1/8000 second being reached. To obtain FP flashing which corresponds to these high shutter speeds, it is necessary to flash approximately four times in 1/8000 second to obtain a uniform quantity of light. Consequently, there is a need for a flash cycle of approximately 30 μs.

With such short flash times, the actual time during which the discharge element flashes becomes shorter than the flash cycle. Further, there is a problem in integrating the quantity of light during this extremely short time and outputting a flash stop signal in time. Even if the flash stop signal is only a little late, excessive flashing will occur, causing non-uniformity in the quantity of light. Excessive flashing caused by slow or inadequate control systems will consume excessive energy from a main capacitor. This will reduce the number of repeated flashes in FP flashing, possibly to the point where repeated flashing can no longer be maintained before the completion of the movement of the rear blind of the focal plane shutter. In any event, there is a danger of producing photographs having problems resulting from non-uniformity in the quantity of light.

Current control systems have proven inadequate to perform accurate control of FP flashing during the actual flashing. For example, Japanese Patent Publication Number HEI 1-124838, discloses a system which does not measure the quantity of light and provide feedback to the duty ratio, rather it causes repeated flashing at a certain duty ratio, and performs exposure adjustment using the aperture and shutter. Thus, when the quantity of light is gradually damped, by the repeated discharge of the capacitor, the appropriate exposure could not be obtained. Adapting this system to provide such feedback and control would require a large increase in cost. Japanese Patent Publication Number HEI 3-144617 discloses a system which gradually changes the duty ratio of the high-speed repeated flashing, but does not specifically exhibit control of the quantity of light.

SUMMARY OF THE INVENTION

Accordingly, it is an object of the present invention to provide an electronic flash control system which accurately controls the quantity of light even during FP flashing.

It is yet another object of the present invention to provide a high-speed repeating flash control system capable of providing a desired quantity of light.

It is another object of the invention to provide a high-speed repeating flash control system capable of accurately controlling the quantity of light emitted.

It is a further object of the present invention to provide a high-speed repeating flash control system capable of accurately controlling the quantity of light emitted, even with shutter speeds as high as 1/8000 second.

It is yet a further object of the invention to provide a high-speed repeating flash control system capable of accurately controlling the quantity of light emitted during each flash in a unit having a flash cycle of approximately 30 μs.

It is yet another object of the invention to provide a method for accurately emitting a desired quantity of light during high-speed repeated flashing.

Additional objects and advantages of the invention will be set forth in part in the description which follows, and, in part, will be obvious from the description, or may be learned by practice of the invention.

The foregoing objects of the present invention are achieved by providing an electronic flash control system having a main capacitor which stores energy for flashing, a discharge element, and a switching apparatus comprising a discharge loop associated with the discharge element, a control unit and a photometric unit. The switching apparatus causes the discharge element to flash multiple times, during the exposure operation of the camera, based on a signal from the control unit generated in accordance with the desired duty ratio. The duty ratio for each flash is determined by the control unit based on a signal from the photometric unit representative of the quantity of light from the previous flash of the discharge element.

Thus, the present invention uses the results of the measurement of a previous flash to control the next flash. As the present invention does not perform real-time control, delays in the system do not adversely affect accuracy.

The foregoing objects are achieved in an electronic flash control system which during the exposure period of a photograph triggers an electronic flash device for a predetermined period, measures the light emitted during the triggering of the electronic flash device, computes the time period for the next triggering of the electronic flash device, triggers the electronic flash device for the calculated time period, and thereafter repeats the steps from measuring the light emitted until the exposure period is finished.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
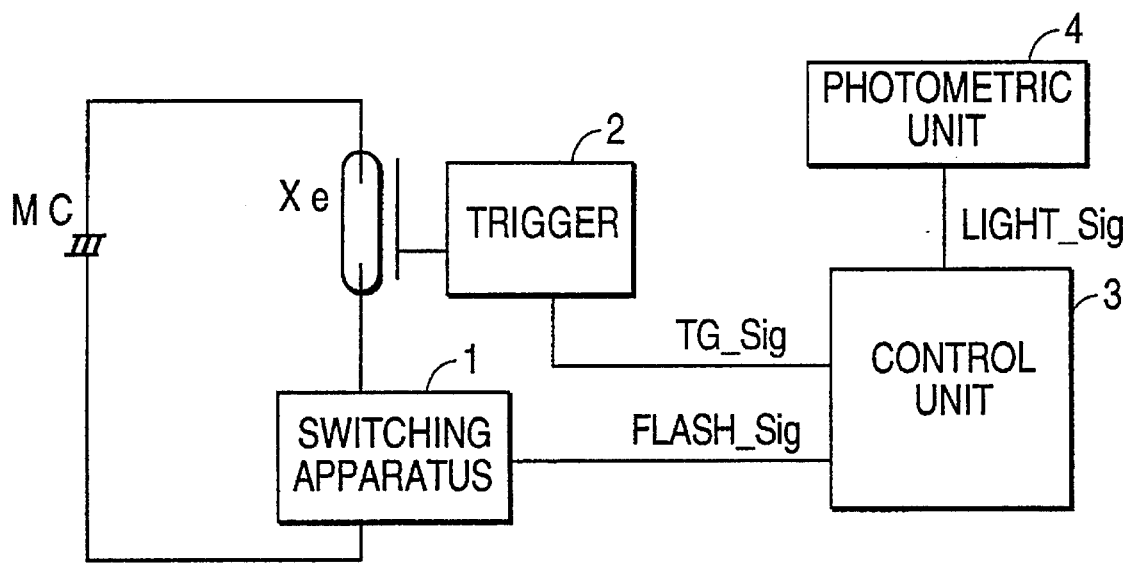
FIG. 1 is a block diagram for a flash control system according to an embodiment of the present invention.

Reference will now be made in detail to the present preferred embodiments of the present invention, examples of which are illustrated in the accompanying drawings, wherein like reference numerals refer to like elements throughout.

As set forth herein, a preferred embodiment of the present invention is described with reference to a camera having a built-in electronic flash with an internal electronic flash control system, making no distinction between the camera body and the electronic flash control system. It will be recognized by one skilled in the art that when the electronic flash control system of the present invention is applied to a system in which the camera body and the electronic flash are detachable, the components of the present invention include those which can be positioned on the camera body and those which can be positioned in the electronic flash.

FIG. 1 is a block diagram of a flash control system in accordance with a first embodiment of the present invention. A main capacitor MC, which stores energy for flashing, is connected to a discharge element Xe by a discharge loop. The discharge element Xe is preferably a Xenon discharge tube. A trigger 2 controls the operating state of the discharge element Xe. A switching apparatus 1 is located in the discharge loop of the main capacitor MC and controls the flashing of the discharge element Xe. A control unit 3 is connected to the switching apparatus 1, the trigger 2, and a photometric unit 4.

A flash signal FLASH_Sig is output from the control unit 3 to the switching apparatus 1. The FLASH_Sig signal has a variable duty ratio, which allows the switching apparatus 1 to turn ON and OFF according to the duty ratio. The control unit 3 also outputs a trigger signal TG_Sig in synchronization with the flash signal FLASH_Sig. Trigger 2 sets the discharge element Xe into a mode in which excitation is possible, allowing excitation to occur in the discharge element Xe simultaneously with the switching ON of the switching apparatus 1.

The light irradiated from the discharge element Xe, while the flash signal FLASH_Sig is active, that is, during the period when the switching apparatus 1 is ON, is integrated by the photometric unit 4 as direct or indirect light, and a signal LIGHT_Sig, proportional to an integrated quantity of available light, is transmitted to the control unit 3. In the control unit 3, the quantity of light integrated by the photometric unit 4 and the appropriate quantity of light, set in advance, are compared, and the duty ratio of the flash signal FLASH_Sig is controlled based on those results. Specifically, if the integrated quantity of light is smaller than the appropriate quantity of light, the duty ratio is increased and the period during which the switching apparatus 1 is ON is extended. Conversely, if the integrated quantity of light is larger than the appropriate quantity of light, the duty ratio is decreased and the period during which the switching apparatus 1 is ON is shortened. This operation is performed for each flash during the exposure operation.

Figure 3:
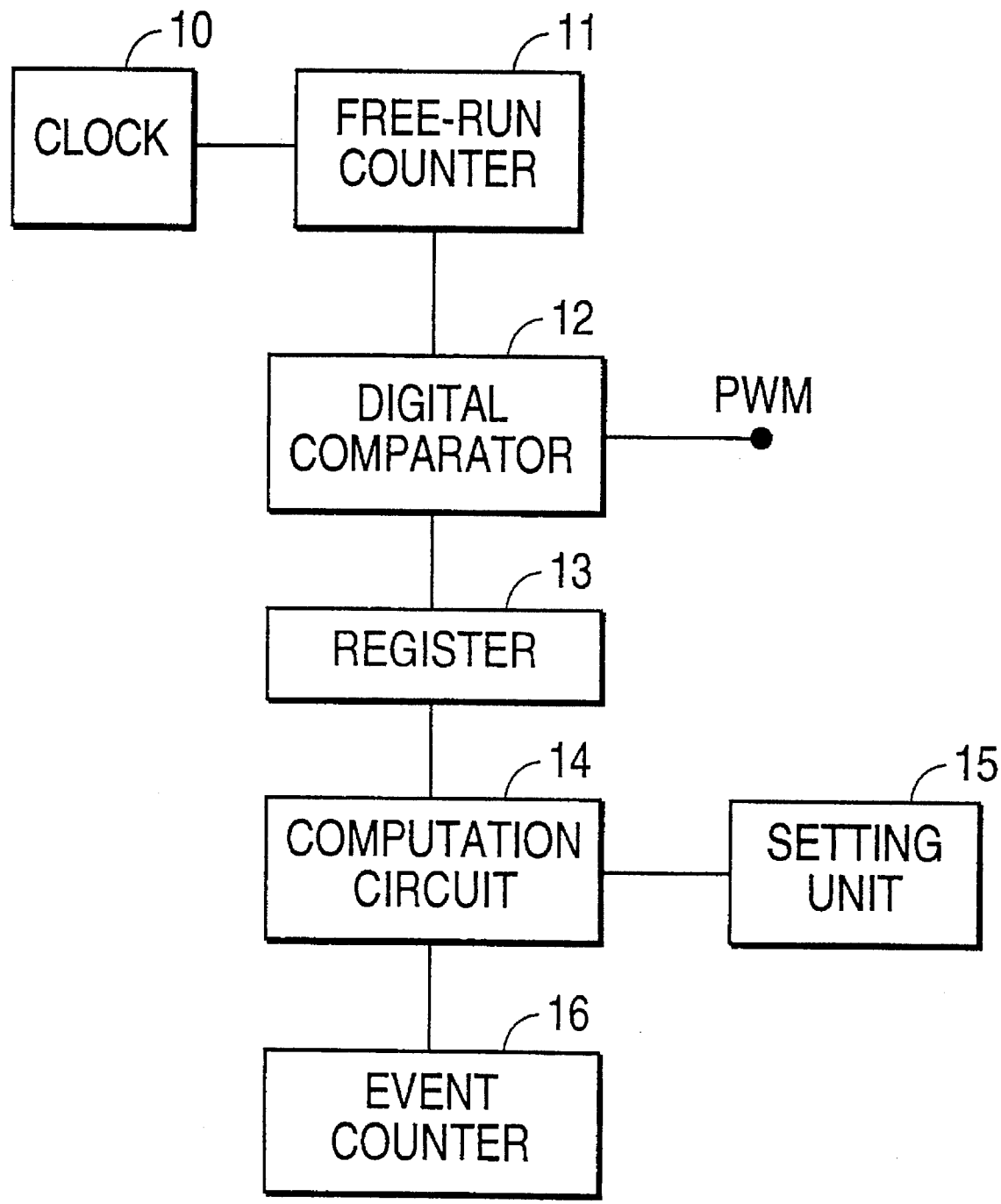
FIG. 3 is a block diagram of a control unit of a flash control system according to an embodiment of the present invention.

FIG. 3 is a block diagram of the relevant portion of a preferred internal configuration of the control unit 3 according to the first embodiment of the present invention. The control unit 3 is preferably a one-chip microcomputer. The flash signal FLASH_Sig is output from the PWM (pulse width modulation) terminal of the microcomputer. A free-run counter 11 of the 7-bit addition counter, positioned inside the microcomputer, takes counts from a clock 10 and continuously counts from 0 to 127. Preferably, the signal of the clock 10 is 4 MHz. A register 13 sets the output duty ratio of the PWM terminal. When the value which has been set in the register 13 is larger than the output of the free-run counter 11, a digital comparator 12 sets the PWM terminal to a High level, and at other times, sets the PWM terminal to a Low level.

Figure 2:
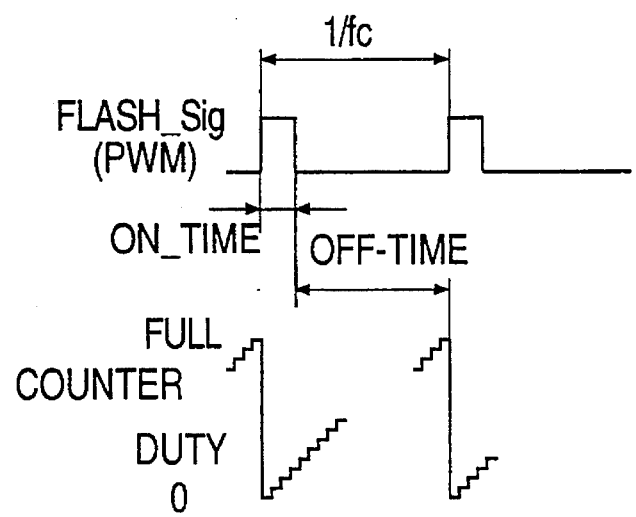
FIG. 2 is a timing diagram for a flash control system according to an embodiment of the present invention.

FIG. 2 shows a timing diagram for the PWM terminal, wherein the time when the PWM terminal is set at the High level is considered the ON_TIME of the switching apparatus 1, and the time when it is at the LOW level is considered the OFF TIME. As the count source is 4 MHz, the frequency fc of the PWM becomes 4 MHz/128=31.25 KHz. Thus, the cycle is 32 µs, allowing the flash control system to operate with shutter speeds as quick as 1/8000 second.

Referring once again to FIG. 3, the photometric unit 4 outputs a pulse whose frequency becomes larger as the measured light strength increases. The pulse of the photometric unit 4 is input to an event counter 16 of the microcomputer. A setting unit 15 sets the appropriate quantity of light using the aperture value, the shutter speed, and the film speed. A computation circuit 14 computes the appropriate duty ratio from the value read from the event counter 16 and the value which corresponds to the appropriate quantity of light from the setting unit 15. The duty ratio is thereafter set in the register 13.

Figure 4:
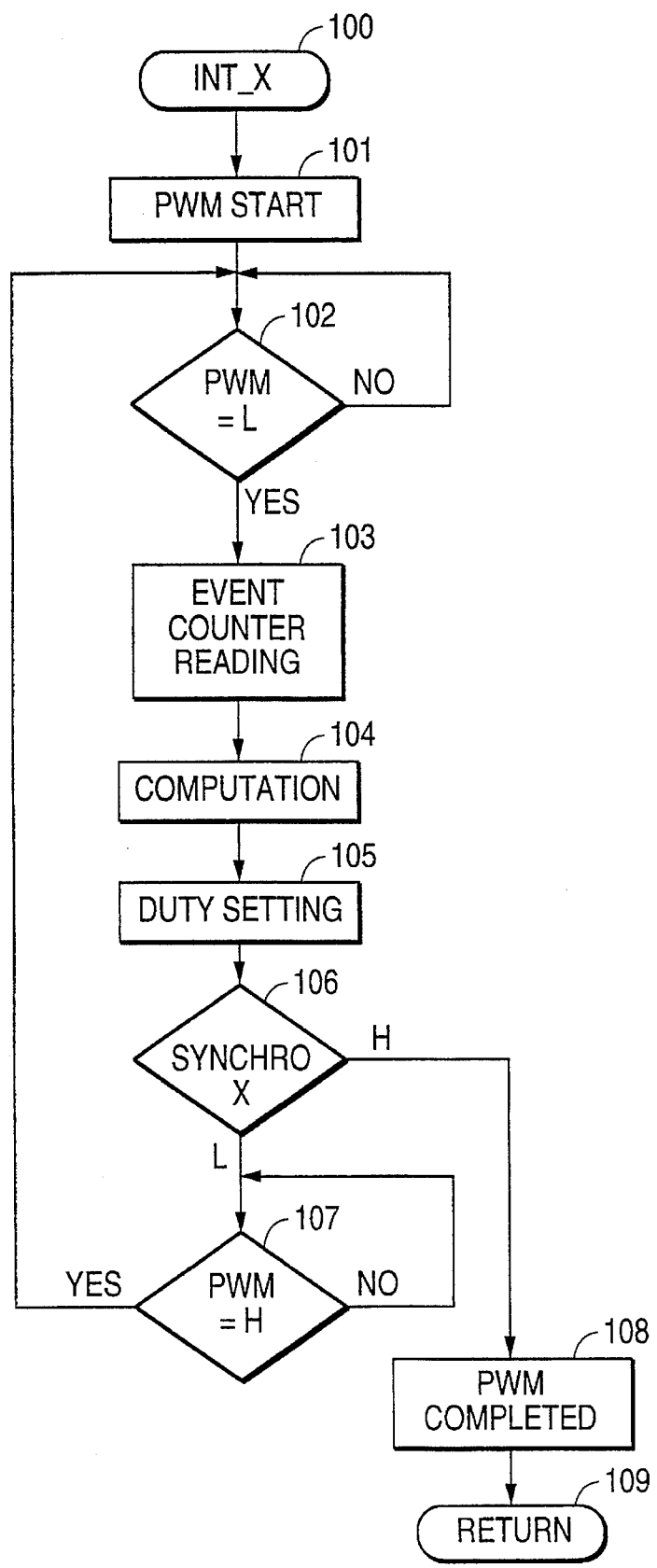
FIG. 4 is a flow chart for the operation of the control unit in a flash control system according to an embodiment of the present invention.
Figure 5:
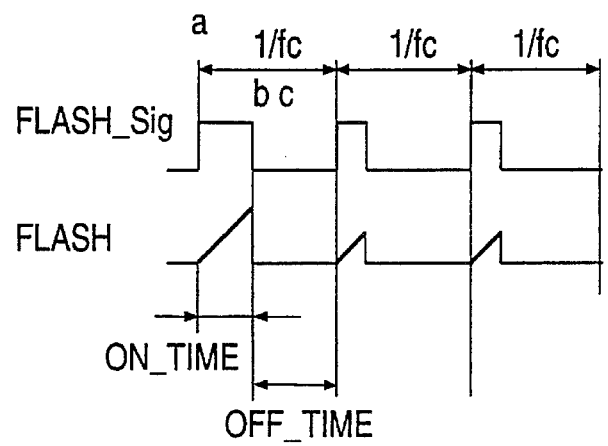
FIG. 5 is a timing diagram for a control unit of a flash control system according to an embodiment of the present invention.

FIG. 4 is a flow chart of the operation of the microcomputer used for the control system 3. Step 100 is the interruption routine generated by the fall of the synchro signal X, by which a command for flash start is given by the camera to the electronic flash control system. In step 101, the experimentally determined initial value is set by the register 13, and PWM is started after the event counter 16 is reset. The timing of the FLASH_Sig with respect to the flash is shown in FIG. 5. In the next step 102, a determination is made as to whether the PWM output is LOW ("L") or not, and if it is Low, that is, if the time of b, in FIG. 5, has elapsed and flashing has stopped, step 103 is proceeded to. In step 103, the computation circuit 14 reads the contents of the event counter 16, that is, the integrated quantity of light during ON_TIME. After this has been stored in the internal memory of the computation circuit 14, preparation is made for the next measurement and the event counter 16 is reset. In step 104, a computation is performed in which the next appropriate flash time, obtained from the value of the event counter 16, is stored in the internal memory of the computation circuit 14 and the value is set by the setting unit 15 (the initial value at the first flash time).

For example, if the value of the event counter 16 is divided by the value set by the setting unit 15, one can determine how many times larger than the appropriate quantity of light the quantity of light is. The first flash waveform of FP flashing is the rise portion of the flash waveform, and, as in the flash waveform FLASH of FIG. 5, it approximates a right triangle. Even if the first flash time is changed, the slope of the hypotenuse is almost fixed, so the quantity of light (the area of the right triangle) is proportional to the square of the flash time (the base of the triangle). Therefore, when N times the quantity of light is obtained, the quantity of light may be set to 1/N times, and for this reason, the first flash time may be set to $1/\sqrt{N}$, that is, the duty ratio may be set to $1/\sqrt{N}$ times.

The duty ratio for the next flash is written to the register 13 in step 105 (with the time indicated by c in FIG. 5). Next in step 106, the synchro signal X is tested. If the signal X is High ("H"), the process of ending PWM is carried out in step 108, and the process is ended in step 109, since the shutter is already closed. If the synchro signal X is still Low, step 102 is returned to, after confirming that the PWM output is High in step 107, and the process is repeated for the next flash.

In this method, the initial first flash is performed according to an initial value, so there is concern that it will not be the appropriate quantity of light. However, the synchro signal X can be output before the shutter of the camera opens, so the initial first flash does not affect the photograph. Therefore, as shown in FIG. 5, flashes from the second time on are maintained at the appropriate quantity of light. Thereafter, the exposure period can be commenced and the appropriate quality of light will be available.

Using $1/\sqrt{N}$ as the basis for computation, there is a possibility that the computation of the duty ratio will not be completed by the next flash if the computation speed of the microcomputer is not fast enough. However, the duty ratio need not be determined for every individual flash, but rather only for every other flash. This will still produce acceptable results because, during FP flashing, there is a tendency for the voltage of the main capacitor to gradually decrease and for the flash waveform for each time to also gradually decrease in strength. Therefore, it is sufficient for control purposes, if the duty ratio is updated once every two flashes, thereby allowing sufficient time for computation.

Although the first embodiment of the present invention has been described with respect to a specific configuration, it will be recognized that the first embodiment is not limited to the specific configurations. For example, although the first embodiment has been described with respect to the use of a microcomputer with an internal PWM function, a configuration in which a peripheral circuit is externally attached to the microcomputer is also possible.

The computation method as presented in the first embodiment, moreover, can be simplified. Instead of performing a complex computation such as $1/\sqrt{N}$ times, it is possible to merely determine whether the quantity of light is too high or too low, than changing the duty ratio by only a specified amount for each case.

Figure 6:
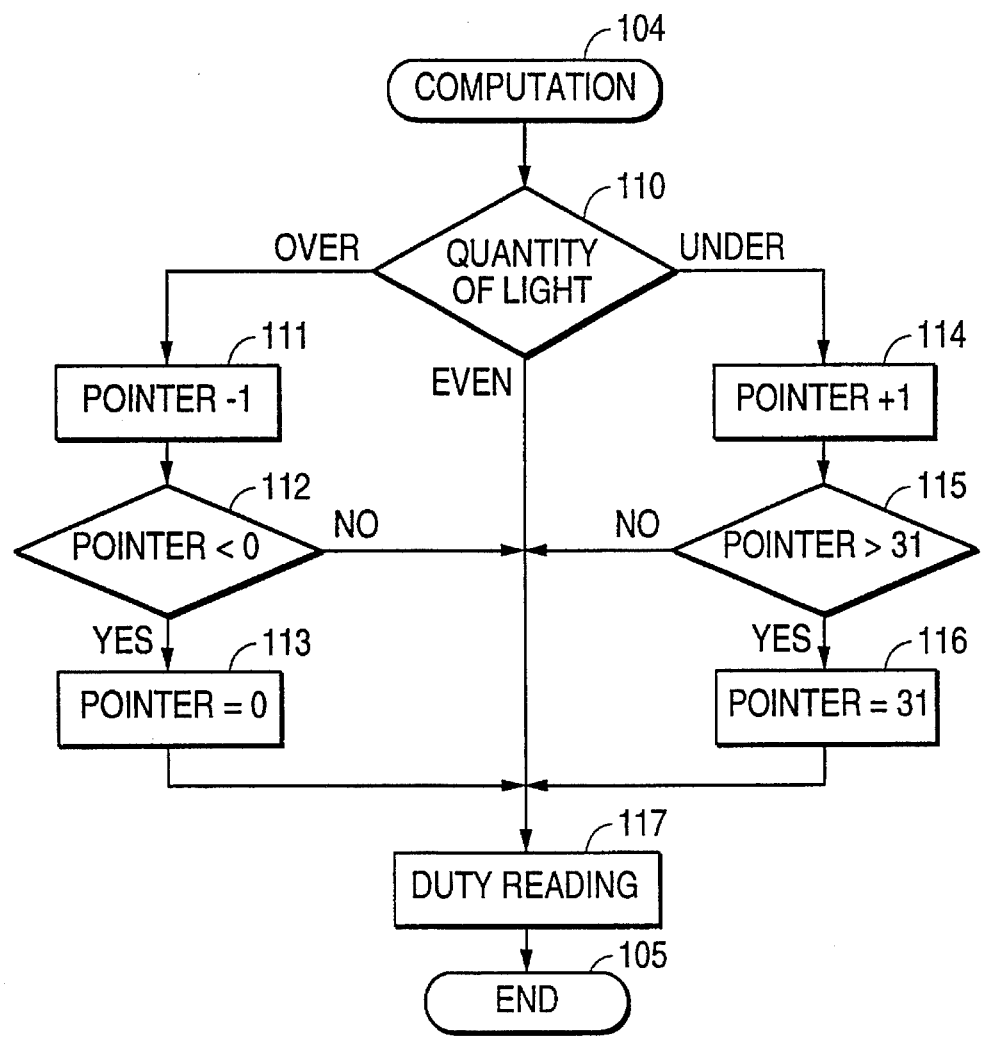
FIG. 6 is a flow chart for the control unit in a flash control system according to an embodiment of the present invention.

FIG. 6 is a flow chart of the operation of a control unit having an alternative computation method (step 104 in FIG. 4) for calculating the duty ratio of a flash control system in accordance with the second embodiment of the present invention. This method uses preset data, an example of which is shown in Table 1.

TABLE 1

| Address | Data | Duty Ratio (%) |
|---------|------|----------------|
| 31 | 116 | 90.625 |
| 30 | 106 | 82.8125 |
| 29 | 96 | 75 |
| 28 | 87 | 67.9688 |
| 27 | 79 | 61.7188 |
| 26 | 72 | 56.25 |
| 25 | 66 | 51.5625 |
| 24 | 60 | 46.875 |
| 23 | 54 | 42.1875 |
| 22 | 49 | 38.2813 |
| 21 | 45 | 35.1563 |
| 20 | 41 | 32.0313 |
| 19 | 37 | 28.9063 |
| 18 | 34 | 26.5625 |
| 17 | 31 | 24.2188 |
| 16 | 28 | 21.875 |
| 15 | 25 | 19.5313 |
| 14 | 23 | 17.9688 |
| 13 | 21 | 16.4063 |
| 12 | 19 | 14.8438 |
| 11 | 17 | 13.2813 |
| 10 | 16 | 12.5 |
| 9 | 14 | 10.9375 |
| 8 | 13 | 10.1563 |
| 7 | 12 | 9.375 |
| 6 | 11 | 8.59375 |
| 5 | 10 | 7.8125 |
| 4 | 9 | 7.03125 |
| 3 | 8 | 6.25 |
| 2 | 7 | 5.46875 |
| 1 | 6 | 4.6875 |
| 0 | 5 | 3.90625 |

Table 1 is a table of preselected values for the duty ratios used for control of FP flashing according to the second embodiment of the present invention. Data is loaded into ROM addresses 0 to 31 of the microcomputer, and the data is generally selected so that it becomes a geometrical progression. In the example shown in Table 1, the data ranges from 5 to 116, and the duty ratios obtained by writing these to the aforementioned 7-bit PWM register would be approximately from 4% to 90%.

In the following description, the term "pointer" refers to a memory location which stores the address of the data table (as in Table 1) from which the data will be read. In this example, reducing the pointer results in smaller data, that is, in the lowering of the duty ratio, causing the quantity of light of the next flash to become smaller.

First, in step 110, if the event counter value read in step 103 (see FIG. 4) and the specified value set by the setting unit 15 are equal, there is no need to change the quantity of light, so step 117 is proceeded to. If the event counter value is large, the quantity of light of the next flash must be made smaller, so the pointer is reduced by 1 in step 111. In step 112 the value of the pointer is tested. If the pointer becomes less than 0, its lowest possible value, it is reset to 0 in step 113. If such an adjustment is performed, a message can be sent to the user notifying him that too much light was produced for the photograph.

If in step 110, the quantity of light is determined to be under the required value, the quantity of light of the next flash must be made larger, and the pointer is increased by 1 in step 114. Thereafter, in step 115 the value of the pointer is tested. If the pointer becomes greater than 31, its greatest possible value, it is reset to 31 in step 116. If such an adjustment is performed, a message can be sent to the user notifying him that too little light was available for the photograph.

In step 117, the new pointer is used to refer to the data table, as in Table 1, and the next duty ratio is obtained. Thereafter, step 105 (in FIG. 4) is returned to, and the setting of the duty ratio is actually updated.

The initial value of the pointer may be set to an appropriate value by a step such as step 101 in FIG. 4. For example, if the address shown in Table 1 is set to the central position 16, the desired quantity of light can be reached within 16 flashes. A synchro signal X can be sent at least 0.5 ms before the deactivation of the front blind suspending magnet of the shutter. Therefore, at a flash frequency of 31.25 KHz, 15 flashes can be made before the start of exposure, and the appropriate quantity of light can be reached at the time of the start of exposure.

Although the second embodiment of the present invention has been described with respect to a flash control system providing specific operational steps, it will be recognized that the second embodiment is not limited to these specific steps. For example, although the second embodiment has been described with respect to a fixed fluctuation of the pointer, it can be modified to reach the appropriate value quickly. Specifically, the fluctuation of the pointer can initially be made larger, in steps 111 and 114. For example, the fluctuation of the pointer may be set to 2 until a specified number of flashes. By way of another example, the fluctuation could initially be set to 2 and after it has been updated one or more times it may be set to 4, and after that, the fluctuation may be returned to 1. Any number of such variations is possible depending on how many pre-flashes the main capacitor will allow.

In accordance with a third embodiment of the present invention, if the photometric unit 4 is made so that it receives light reflected from the subject, automatic light adjustment through FP flashing is possible. If at least the shutter speed Tv, the aperture value Av, and the film speed Sv are transmitted to the electronic flash device, TTL like control can be achieved. The FP flashing flash cycle is expressed as FPTv (by the same apex method as Tv). When the count value n for each unit of time (Tv=0) of the event counter 16 is expressed by Cv, the relationship to the appropriate quantity of light is expressed by Equation 1 below.

Tv+Av−Sv=Cv (Equation 1)

TABLE 2

| A - Lookup Value | Shutter Speed (To Determine Tv · FPT v) | Aperture (To Determine AV) | ISO (To Determine SV) | CV · FPC v |
|---|---|---|---|---|
| −6 | | | | n/64 |
| −5 | | | | n/32 |
| −4 | | | | n/16 |
| −3 | | | | n/8 |
| −2 | | | | n/4 |
| −1 | | | | n/2 |
| 0 | 1 | 1.0 | 3 | n |
| 1 | 1/2 | 1.4 | 6 | n × 2 |
| 2 | 1/4 | 2.0 | 12 | n × 4 |
| 3 | 1/8 | 2.8 | 25 | n × 8 |
| 4 | 1/15 | 4.0 | 50 | n × 16 |
| 5 | 1/30 | 5.6 | 100 | n × 32 |
| 6 | 1/60 | 8.0 | 200 | n × 64 |
| 7 | 1/125 | 11 | 400 | n × 128 |
| 8 | 1/250 | 16 | 800 | n × 256 |
| 9 | 1/500 | 22 | 1600 | n × 512 |
| 10 | 1/1000 | 32 | 3200 | n × 1024 |
| 11 | 1/2000 | 45 | 6400 | n × 2048 |
| 12 | 1/4000 | 64 | 12500 | n × 4096 |
| 13 | 1/8000 | 90 | | n × 8192 |
| 14 | 1/16000 | 128 | | n × 16384 |

TABLE 2-continued

| A - Lookup Value | Shutter Speed (To Determine Tv · FPT v) | Aperture (To Determine AV) | ISO (To Determine SV) | CV · FPC v |
|---|---|---|---|---|
| 15 | 1/32000 | | | n × 32768 |

Table 2 is a look-up table to determine values for Tv, Av, and So based on shutterspeed, aperture, and ISO film speed respectively. For example, the appropriate quantity of light is expressed by Cv=0 when Tv=0 (corresponds to 1 second), Av=0 (corresponds to F1), and Sv=0 (corresponds to ISO3), and the content of Cv=0 is the counter value n, which gives the quantity of light. Actually, Cv is obtained when Tv, Av and Sv are determined. For example, when Tv=9 (corresponds to 1/500 second), Av=5 (corresponds to F5.6), and Sv=5 (corresponds to ISO100), the quantity of light may be controlled so that Cv=9 (counter value =n × 512). In this case, where Cv=9, the value corresponds to the counter value where the quantity of light has continued for a unit of time (Tv=0, 1 second). If the actual count value of the first cycle portion of FP flashing is considered FPCv, FPCv is expressed by Equation 2 below.

FPCv=Cv−FPTv (Equation 2)

By the previous example, the result is expressed by Equation 3 below:

FPCv=9−15=−6 (Equation 3)

Therefore, the appropriate quantity of flash light per FP flashing cycle is a quantity of light which is 1/64 the counter value n. Thus, if the counter value of the event counter 16, for one FP flashing cycle, is controlled so that it approaches n/64, as in FIG. 4, the appropriate quantity of light can be obtained.

Thus, it is possible to change the duty ratio of FP flashing according to the settings for the shutter speed, the aperture value, and the film speed to perform light adjustment automatically through FP flashing. A photographer is now able to take photographs, as he or she wishes, much in the same way as TTL automatic light adjustment, without performing complicated computations in which such factors as the shutter speed and the photographing distance are used as parameters.

Although the third embodiment of the present invention has been described with respect to a specific configuration, it will be recognized that the third embodiment is not limited to the specific configuration.

In accordance with the preferred embodiments of the present invention, in FP flashing, flashing is performed for a specified time, the quantity of light is measured, and the results are used to control the next flash, so the slowness of the control unit no longer directly has an adverse effect on accuracy. Also, adequate execution is possible at the processing speed of the one-chip microcomputers which are currently on the market, and a considerable number of the parts of an analog processing circuit which were previously needed can be replaced with such a microcomputer. This makes possible a reduction in the total cost of the electronic flash control system.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An electronic flash control system for causing a discharge element to flash multiple times based on a variable duty ratio during an exposure cycle of a camera, the control system comprising:

a main capacitor;

a discharge loop associated with the discharge element;

a photometric unit for outputting a signal corresponding to the quantity of light emitted from the discharge element and received by the photometric unit; and a switching apparatus connected to said discharge loop and including
a control unit adapted to output a control signal based on the duty ratio which causes the discharge element to turn on and off, said control system varying the duty ratio based on said photometric unit signal.

2. The electronic flash control system, as recited in claim 1, wherein said control unit outputs said control signal at predetermined multiple cycles during the exposure cycle of the camera.

3. The electronic flash control system, as recited in claim 1, further comprising:

said control system having a storage unit for storing data related to predetermined multiple duty ratios, said control unit varying the duty ratio based on said photometric unit signal and said predetermined multiple duty ratio data stored in said storage unit.

4. The electronic flash control system, as recited in claim 1, wherein said control unit is a microcomputer having a PWM function for outputting said control signal.

5. The electronic flash control system, as recited in claim 1, wherein said control unit varies the duty ratio based on a shutter speed, an aperture valve, a film speed, a flash cycle of the discharge element, a predetermined standard exposure value, and said photometric unit signal.

6. The electronic flash control system, as recited in claim 1, wherein said discharge element is a xenon discharge tube.

7. A method of controlling an electronic flash system during the exposure period of a photograph comprising:

emitting light from the electronic flash system for an initial predetermined period;

measuring the light received during the emission of the electronic flash system;

computing an appropriate time period for next emission of the electronic flash system based on a quantity of light required for the photograph and the light received during the prior emission of the electronic flash system;

triggering the electronic flash device for said appropriate period; and repeating the method from the step of measuring the light until the exposure period expires.

8. A method of controlling an electronic flash system, as recited in claim 7, wherein said appropriate period is determined by increasing or decreasing a pointer, said pointer indicative of an entry corresponding to a period of time in a table, said table containing a sequence of said entries.

9. A method of controlling an electronic flash system, as recited in claim 7, wherein said pointer is initially set to indicate an entry in the middle of said table.

10. A method of controlling an electronic flash system, as recited in claim 7, wherein the step of triggering the electronic flash device for an initial predetermined period occurs prior to the start of the exposure period.

11. A method of controlling an electronic flash system, as recited in claim 7, wherein said appropriate period is determined based on the aperture, the shutter speed, the film speed, the predetermined standard exposure value and the light emitted during the prior emission of the electronic flash system.

12. A method of controlling an electronic flash system, as recited in claim 7, wherein the step of measuring the light emitted during the emission of the electronic flash system comprises:

measuring the light reflected back toward the electronic flash system during the emission of the electronic flash system.

* * * * *